United States Patent [19]

Miller

[11] Patent Number: 5,942,104
[45] Date of Patent: Aug. 24, 1999

[54] ALUMINA SOURCE FOR NON-ZEOLITIC MOLECULAR SIEVES

[75] Inventor: Stephen J. Miller, San Francisco, Calif.

[73] Assignee: Chevron U.S.A. Inc., San Francisco, Calif.

[21] Appl. No.: 08/993,680

[22] Filed: Dec. 18, 1997

Related U.S. Application Data

[60] Division of application No. 08/704,055, Aug. 28, 1996, Pat. No. 5,741,751, which is a continuation-in-part of application No. 08/553,211, Nov. 7, 1995, abandoned.

[51] Int. Cl.⁶ .......................... C10G 11/02; C10G 35/04; C10G 47/02; C10G 73/02
[52] U.S. Cl. ............................... 208/28; 208/46; 208/108; 208/114; 208/134; 585/400; 585/477; 585/500; 585/708; 585/740
[58] Field of Search .......................... 208/28, 46, 108, 208/114, 134; 585/400, 477, 500, 708, 740

[56] References Cited

U.S. PATENT DOCUMENTS

| | | | |
|---|---|---|---|
| 4,310,440 | 1/1982 | Wilson et al. | 252/435 |
| 4,440,871 | 4/1984 | Lok et al. | 502/214 |
| 4,673,559 | 6/1987 | Derouane et al. | 423/306 |
| 4,861,743 | 8/1989 | Flank et al. | 502/214 |
| 4,877,593 | 10/1989 | Valyocsik | 423/306 |
| 4,913,796 | 4/1990 | Valyocsik | 208/46 |
| 4,943,424 | 7/1990 | Miller | 423/328 |
| 5,051,246 | 9/1991 | Clark et al. | 423/305 |
| 5,084,159 | 1/1992 | Abdo et al. | 208/28 |
| 5,096,684 | 3/1992 | Guth et al. | 423/306 |
| 5,158,665 | 10/1992 | Miller | 208/46 |
| 5,178,846 | 1/1993 | Buelow et al. | 423/710 |
| 5,230,881 | 7/1993 | Miller | 423/705 |
| 5,232,683 | 8/1993 | Clark et al. | 423/708 |
| 5,306,480 | 4/1994 | Brown | 423/625 |
| 5,374,411 | 12/1994 | Davis et al. | 502/208 |
| 5,445,807 | 8/1995 | Pearson | 423/625 |
| 5,514,362 | 5/1996 | Miller | 423/702 |
| 5,552,132 | 9/1996 | Evans | 502/208 |
| 5,741,751 | 4/1998 | Miller | 502/208 |

FOREIGN PATENT DOCUMENTS

| | | | |
|---|---|---|---|
| 209997 | 1/1987 | European Pat. Off. | 208/28 |
| 0 132 708 | 2/1998 | European Pat. Off. | |

OTHER PUBLICATIONS

Zhao et al., "Synthesis and Properties of Novel Aluminophosphate Molecular Sieves Produced with Ethylenediamine", *Zeolites*, 1993, vol. 13, Nov./Dec.

*Primary Examiner*—Wayne Langel
*Attorney, Agent, or Firm*—Alan W. Klaassen

[57] ABSTRACT

This invention provides a method for preparing non-zeolitic molecular sieves using inexpensive reagents and at lower manufacturing cost. The method includes using a low density, small size particulate hydrated alumina, such as aluminum hydroxide, in place of aluminum alkoxides and other more costly reagents. The preferred particulate hydrated alumina has a density of less than 1.0 g/cm³, an average particle size of less than about 40 microns and an alkali content of less than 0.12 wt %.

31 Claims, No Drawings

ALUMINA SOURCE FOR NON-ZEOLITIC MOLECULAR SIEVES

This application is a divisional application of U.S. Ser. No. 08/704,055, filed Aug. 28, 1996, U.S. Pat. No. 5,741,751, which is a continuation in part of U.S. Ser. No. 08/553,211, filed Nov. 7, 1995, now abandoned.

BACKGROUND OF THE INVENTION

This invention relates to the synthesis of non-zeolitic molecular sieves. It more particularly relates to a method of preparing non-zeolitic molecular sieves (NZMS) at low cost and with simplified processing.

The non-zeolitic molecular sieves to which the present invention is directed comprise crystalline, three-dimensional microporous framework structures of tetrahedrally-bound $AlO_2$ and $PO_2$ oxide units, and optionally one or more metals in tetrahedral coordination with oxygen atoms. See U.S. Pat. No. 4,861,743. The crystalline aluminophosphate-type materials which are prepared by the present process are useful, inter alia, for a number of catalytic conversion processes, including dewaxing, isomerization, hydroisomerization, hydrocracking, hydrogenation.

A non-zeolitic molecular sieve is prepared from a reaction mixture comprising active sources of the molecular sieve, including active source(s) of aluminum and phosphorous. A preferred active source of alumina in the conventional preparation of the non-zeolitic molecular sieves is an aluminum alkoxide, such as aluminum isopropoxide, or a pseudo-boehmite hydrated aluminum oxide. U.S. Pat. No. 4,310,440, which discloses aluminum phosphate molecular sieves, and U.S. Pat. No. 4,440,871, which discloses silicoaluminophosphates and their preparation, list these sources of aluminum for the preparation of these molecular sieves. These disclosures are completely incorporated herein by reference for all purposes.

U.S. Pat. No. 4,673,559 discloses a hydrolysis method for preparing crystalline silicoaluminophosphates. Useful sources of aluminum oxide taught in '559 include any form of aluminum oxide or hydroxide, organic or inorganic salt or compound. A similar list of aluminum oxide sources is given in U.S. Pat. Nos. 4,877,593 and 4,913,796, which disclose a method of synthesizing a crystalline aluminophosphate using a $C_5$–$C_7$ alkyldiamine directing agent.

U.S. Pat. No. 5,232,683 discloses a method for preparing a crystalline aluminophosphate using a diamine templating agent. Suitable aluminum sources taught in '683 include aluminum oxides such as gamma and beta aluminas, hydroxides as well as mixtures thereof, such as gibbsite, boehmite and pseudo-boehmite or aluminum alkoxides, such as aluminum tri-isopropoxide.

Zhao et al., "Synthesis and Properties of Novel Aluminophosphate Molecular Sieves Produced with Ethylenediamine", *Zeolites*, 1993, Vol 13, November/December, describes synthesis and properties of $AlPO_4$-12 and two reportedly novel aluminophosphates. Aluminum hydroxide, $Al(OH)_3$, was used as the source of alumina in these preparations.

U.S. Pat. No. 5,096,684 to Guth et al. lists aluminum oxides and hydroxides, such as aluminum hydroxide [Al(OH)$_3$,] boehmite [AlO(OH)] or pseudo boehmite as aluminum sources for preparing SAPO-5, SAPO-11 and SAPO-34. U.S. Pat. No. 5,178,846 to Buelow et al. lists aluminum hydroxide gel and pseudo-boehmite as suitable aluminum compounds to make a wide-pore crystalline aluminophosphate molecular sieve. U.S. Pat. Nos. 5,051,246 and 5,232,683 to Clark, et al. mentions boehmite and pseudo-boehmite in the preparation of aluminophosphates, silicoaluminophosphates and metalloaluminophosphates. U.S. Pat. No. 4,673,559 to Derouane, et al. lists aluminum oxide or hydroxide organic or inorganic salts or compounds as sources of aluminum oxide in the preparation of silicophosphoaluminates.

U.S. Pat. No. 5,230,881 discloses a method for synthesizing substantially pure crystalline SAPO-31. Example methods taught in '881 for preparing both SAPO-31 and other silicoaluminophosphates use pseudo-boehmite (Catapal B and Catapal SB) materials.

A preferred source of alumina in the conventional preparation of non-zeolitic molecular sieves is an aluminum alkoxide, such as aluminum isopropoxide. While other alumina sources have been taught, none have been shown to produce non-zeolitic molecular sieves having catalytic properties, such as catalyst activity and selectivity in the conversion of petroleum and organic feedstocks, equal to that of a non-zeolitic molecular sieve prepared using an aluminum alkoxide as the alumina source. However, aluminum alkoxides are expensive relative to other alumina sources. Furthermore, in the use of aluminum alkoxides in the preparation of non-zeolitic molecular sieves, a waste stream rich in alcohols is produced; this waste stream must be treated or disposed, at additional processing expense. An improved method for preparing a non-zeolitic molecular sieve is desired.

SUMMARY OF THE INVENTION

It is therefore an object of the present invention to provide a non-zeolitic molecular sieve (NZMS), which has high activity and selectivity in the conversion of petroleum and organic feedstocks, and which is prepared using reagents which are less costly than those used in conventional preparation methods. It is a further object of the present invention to provide an improved process for preparing a non-zeolitic molecular sieve using a particulate hydrated alumina, such as $Al(OH)_3$, as the alumina source. It is a further object of the present invention to provide an improved molecular sieve at reduced manufacturing cost and with simplified operation.

The present invention is based in part on the surprising discovery that an improved non-zeolitic molecular sieve having good catalytic activity and selectivity may be prepared using a low cost hydrated alumina source, preferably a particulate hydrated alumina having a small particle size, a low particle density, and a low alkali content. The particle size of the preferred hydrated alumina source is smaller than that previously taught for the preparation of non-zeolitic molecular sieves, and the alkali content (including sodium) of the preferred particulate alumina is lower than that normally found in low-cost alumina sources. Further to the surprise is the discovery that a non-zeolitic molecular sieve having an alkali content within the present range has comparable catalytic performance to a non-zeolitic molecular sieve prepared with an expensive alumina source which is substantially free of alkali.

The present invention is directed to a process, and the produced product, for preparing a molecular sieve comprising maintaining a reaction mixture containing an active source of phosphorous and a particulate hydrated alumina under crystallization conditions until crystals of the molecular sieve form, the particulate hydrated alumina having an average particle size of less than about $40\mu$, a particle density of less than about 1.0 g/cm$^3$ and an alkali content of less than about 0.12% by weight.

The particulate hydrated alumina for this process preferably has an average particle size of less than about 25µ and more preferably less than about 10µ, with preferably less than about 25% of the particulates having an average particle size outside of a range of about 0.1µ to about 4µ. The most preferred particulate hydrated alumina has an average particle size within a range of about 0.1µ to about 10µ, with less than 25% and preferably less than 10% of the particles having an average particle size outside of a range of about 0.1µ to about 25µ. A preferred particulate hydrated alumina for this process has a particle density of less than about 0.9 g/cm$^3$, more preferably less than about 0.8 g/cm$^3$, and most preferably in the range of about 0.1 g/cm$^3$ to about 0.8 g/cm$^3$.

In a separate embodiment, the present invention is directed to a molecular sieve prepared using a process comprising maintaining a reaction mixture containing an active source of phosphorous and a particulate hydrated alumina under crystallization conditions until crystals of the molecular sieve form, the particulate hydrated alumina having an average particle size of less than about 40µ, a particle density of less than about 1.0 g/cm$^3$ and an sodium content of less than 0.12 wt %. In a further embodiment, the present invention is directed to a non-zeolitic molecular sieve which contains less than 500 ppm alkali, preferably from about 75 to about 500 ppm alkali, more preferably from about 75 to about 400 ppm alkali and most preferably from about 75 to about 225 ppm alkali.

DETAILED DESCRIPTION OF THE INVENTION

The present process for preparing crystalline materials containing oxides of aluminum and phosphorous in tetrahedral coordination is characterized in part by the use of a source of alumina which is both cheaper and easier to use than the conventional sources, while producing non-zeolitic molecular sieves having catalytic properties which approach, are equal to or exceed the properties of the best non-zeolitic molecular sieves prepared using conventional sources.

The particulate hydrated alumina used in the present process for preparing a non-zeolitic molecular sieve has a particle density of less than about 1.0 g/cm$^3$, preferably less than about 0.9 g/cm$^3$, more preferably less than about 0.8 g/cm$^3$ and most preferably in the range of about 0.1 g/cm$^3$ to about 0.8 g/cm$^3$. The low density particulate alumina includes hydrated aluminas having an H$_2$O/Al$_2$O$_3$ molar ratio of Al$_2$O$_3$:nH$_2$O, where n is greater than 2.2, preferably greater than 2.6, more preferably greater than 2.8. An example hydrated alumina useful in the present process is Reheis (Berkeley Heights, N.J.) F-2000 aluminum hydroxy carbonate, containing up to 10% carbonate and having an Al$_2$O$_3$:H$_2$O molar ratio corresponding approximately to Al(OH)$_3$, or Al$_2$O$_3$:3H$_2$O.

The particulate hydrated alumina, as added to the reaction mixture in which the non-zeolitic molecular sieve is formed, further has an average particle size of less than about 40µ, preferably less than about 25µ, more preferably less than about 15µ, still more preferably less than about 10µ, and most preferably within the range of about 0.1µ to about 10µ, with preferably less than about 25% of the particulates having a particle size outside of a range of about 1.0µ about 40µ. In the more preferred embodiment, less than about 25%, even more preferably less than 10% of the particles have a particle size outside of a range of about 0.1µ to about 25µ.

As used herein, the symbol "µ" represents a measure of length in microns or, in the alternative, micrometers. In terms of particle size of the small particles described herein, this measure of length is a measure of the nominal or average diameters of the particles, assuming that they approximate a spherical shape, or, in the case of elongated particles have a circular cross-section. A variety of analytical methods are available to practitioners for determining the size of small particles. One such method employs a Coulter Counter, which uses a current generated by platinum electrodes on two sides of an aperture to count the number, and determine the size, of individual particles passing through the aperture. The Coulter Counter is described in more detail in J. K. Beddow, ed., Particle Characterization in Technology, Vol 1, Applications and Microanalysis, CRC Press, Inc, 1984, pp. 183–6, and in T. Allen, Particle Size Measurement, London: Chapman and Hall, 1981, pp. 392–413. A sonic sifter, which separates particles according to size by a combination of a vertical oscillating column of air and a repetitive mechanical pulse on a sieve stack, can also be used to determine the particle size distribution of particles used in the process of this invention. Sonic sifters are described in, for example, T. Allen, Particle Size Measurement, London: Chapman and Hall, 1981, pp. 175–176. The average particle size may also be determined by a laser light scattering method, using, for example, a Malvern MasterSizer instrument. An average particle size may then be computed in various well-known ways, including:

$$\text{Number Average} = \frac{\sum_{i=1}^{n}(z_i \times L_i)}{\sum_{i=1}^{n} z_i}$$

wherein $z_i$ is the number of particles whose minimum length falls within an interval $L_1$. For purposes of this invention, average crystal size will be defined as a number average.

The particulate alumina used in the present process has a particle diameter which is smaller than that taught in conventional processes, including the grinding/homogenization step which is taught in, for example, U.S. Pat. No. 5,208,005, the entire disclosure of which is incorporated by reference for all purposes. While it is not detrimental to the present process to use a grinding/homogenization step during the practice of the present invention, it has been found that the best non-zeolitic molecular sieve, in terms of catalyst performance, is achieved when the particulate alumina which is added to the reaction mixture has an average particle size of less than 40µ prior to any reaction mixture grinding/homogenization step.

A non-zeolitic molecular sieve is preferably prepared according to the present process using a particulate hydrated alumina having a low alkali content. As used herein, the term alkali refers to the metallic elements in Group IA of the Periodic Table of the Elements (CAS), a copy of which may be found in the inside front cover of the R. H. Perry and C. H. Chilton, eds, Chemical Engineers' Handbook, McGraw-Hill Book Company, 5th Ed., 1973, and includes, for example, the metals lithium, sodium, potassium, rubidium and cesium. In practice, sodium is the alkali of primary concern in the preparation of the non-zeolitic molecular sieve, and the ratio of sodium to total alkali in the particulate alumina source and in the molecular sieve may be as high as 80%, 90% and even up to 100%. It has been surprisingly discovered that conventional methods of removing sodium and other alkali contaminants from a finished NZMS, such as by ion-exchange after calcination, tend to damage the crystal structure of the NZMS and to degrade its catalytic properties. For this and other reasons, the particulate hydrated alumina of the present process has a low alkali level, specifically a low sodium level, before it is added to the reaction mixture from which and in which the NZMS is prepared.

The particulate hydrated alumina useful for the present process contains less than about 0.12 wt % and preferably less than 0.10 wt % alkali. It is most preferred that the particulate hydrated alumina have an alkali content in the range of about 0.01 wt % to about 0.10 wt %, [to about 0.10% to %] where alkali may be one or more of the Group IA elements. This amount of alkali is significantly lower than what is present in available low alkali hydrated aluminas having an average particle size of less than about 40μ and a particle density of less than about 1.0 g/cm³. Typically, "low-alkali" hydrated aluminas currently available have an alkali content of greater than 0.25 wt %, which is significantly higher than that amount of alkali in the present hydrated alumina.

Alkali content may be suitably determined using atomic spectroscopy. Such methods are well known in the art, and it should not be necessary to describe them in detail here. The finished non-zeolitic molecular sieve prepared using the present process contains less than 500 ppm alkali, preferably from about 75 to about 500 ppm alkali, more preferably from about 75 to about 400 ppm alkali and most preferably from about 75 to about 225 ppm alkali.

The non-zeolitic molecular sieves which may be prepared using the present process are described, for example, in U.S. Pat. No. 4,861,743, the disclosure of which, is completely incorporated herein by reference for all purposes. Non-zeolitic molecular sieves include aluminophosphates (AlPO$_4$) as described in U.S. Pat. No. 4,310,440, silicoaluminophosphates (SAPO), metalloaluminophosphates (MeAPO), and nonmetal substituted aluminophosphates (ElAPO). Metalloaluminophophate molecular sieves are described in U.S. Pat. Nos. 4,500,651; 4,567,029; 4,544,143; 4,686,093 and 4,861,743. Nonmetal substituted aluminophosphates are described in U.S. Pat. No. 4,973,785. The preferred non-zeolitic molecular sieve prepared as described herein is an intermediate pore silicoaluminophosphate or SAPO. More preferred SAPO's include SAPO-11, SAPO-31, and SAPO-41. U.S. Pat. No. 4,440,871 describes SAPO's generally and SAPO-11, SAPO-31, and SAPO-41 specifically. A still more preferred intermediate pore isomerization silicoaluminophosphate molecular sieve prepared in the present process is SAPO-11. The most preferred intermediate pore SAPO prepared by the present process is SM-3, which has a crystalline structure falling within that of the SAPO-11 molecular sieves. A preparation of SM-3 and its unique characteristics are described in U.S. Pat. 5,158,665. These disclosures are completely incorporated herein by reference for all purposes. As used herein, the term "non-zeolitic molecular sieve" and its abbreviation "NZMS" will be used interchangeably.

By "intermediate pore size", as used herein, is meant an effective pore aperture in the range of about 5.3 to about 6.5 Angstroms when the molecular sieve is in the calcined form. The effective pore size of the molecular sieves can be measured using standard adsorption techniques and hydrocarbonaceous compounds of known minimum kinetic diameters. See Breck, Zeolite Molecular Sieves, 1974 (especially Chapter 8); Anderson et al., J. Catalysis 58, 114 (1979); and U.S. Pat. No. 4,440,871, all of which are incorporated herein by reference.

Intermediate pore size molecular sieves will typically admit molecules having kinetic diameters of 5.3 to 6.5 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular sieve, but do not penetrate as quickly and in some cases are effectively excluded. Compounds having kinetic diameters in the range of 6 to 6.5 angstroms include:cyclohexane (6.0), 2,3-dimethylbutane (6.1), and m-xylene (6.1). Generally, compounds having kinetic diameters of greater than about 6.5 Angstroms do not penetrate the pore apertures and thus are not absorbed into the interior of the molecular sieve lattice. Examples of such larger compounds include: o-xylene (6.8), hexamethylbenzene (7.1), and tributylamine (8.1). The preferred effective pore size range is from about 5.5 to about 6.2 Angstroms.

The non-zeolitic molecular sieve prepared using this process is characterized by a three-dimensional microporous framework structure of AlO$_2$, and PO$_2$ tetrahedral oxide units with a unit empirical formula on an anhydrous basis of.

$(M_xAl_yP_x)O_2$ wherein:

"M" represents at least one element, other than aluminum and phosphorous, which is capable of forming an oxide in tetrahedral coordination with AlO$_2$ and PO$_2$ oxide structural units in the crystalline molecular sieve; and "x", "y", and "z" represent the mole fractions, respectively, of element "M", aluminum, and phosphorus, wherein "x" has a value equal to or greater than zero (0), and "y" and "z" each have a value of at least 0.01.

In a preferred embodiment, metallic element "M" is selected from the group consisting of arsenic, beryllium, boron, chromium, cobalt, gallium, germanium, iron, lithium, magnesium, manganese, silicon, titanium, vanadium, nickel, and zinc, more preferably selected from the group consisting of silicon, magnesium, manganese, zinc, and cobalt; and still more preferably silicon.

While the unit empirical formula represented above is on an anhydrous basis, the non-zeolitic molecular sieve as prepared herein may exist in any state or degree of hydration. It will be clear to one skilled in the art from the present disclosure that the non-zeolitic molecular sieve formed in the reaction mixture may be hydrated to some degree depending on the synthesis material used and on the amount of heat treatment applied to the crystalline molecular sieve. Both hydrated as well as anhydrous non-zeolitic molecular sieves are within the scope of the present invention.

In preparing the non-zeolitic molecular sieve according to the present invention, an organic templating agent, also known as a structure directing agent, is generally added to the reaction mixture to facilitate crystallization of the molecular sieve. Organic templating agents can be selected from those known to be effective in the synthesis of crystalline molecular sieves and crystalline zeolites. U.S. Pat. Nos. 4,710,485; 4,440,871; 4,310,440; 4,567,029; 4,686,093; and 4,913,799 include examples of suitable templating agents. The disclosure of each of these patents, particularly as relating to templating agents, is incorporated herein by reference.

In general the templating agents useful in the present invention contain elements of Group VA of the Periodic Table of Elements (CAS), particularly nitrogen, phosphorus, arsenic and antimony, preferably nitrogen or phosphorus and most preferably nitrogen. The templating agents also contain at least one alkyl or aryl group having from 1 to 8 carbon atoms. Particularly preferred nitrogen-containing compounds for use as templating agents are the amines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2(OH)_2]_x$ wherein "x" has a value of at least 2 are also suitably employed. Both mono-, di- and triamines are advantageously utilized, either alone or in combination with a quaternary ammonium compound or other templating compound. Mixtures of two or more templating agents can either produce mixtures of the desired non-zeolitic molecular sieves or the more strongly directing templating species may control the course of the reaction with the other templating species serving primarily to establish the pH conditions of the reaction gel. Representative templating agents include tetramethylammonium, tetraethylamonium, tetrapropylammonium or tetrabutylammonium ions; di-n-propylamine; di-isopropylamine; tripropylamine; triethylamine, triethanolamine, piperidine; cyclohexylamine; 2-methylethanolamine; choline; $N_1N$-dimethylbenzylamine; $N_1N$-dimethylethanolamine; choline; $N_1N$-dimethylpiperazine; 1,4-diazabicyclo(2,2,2,)octane; N-methyidiethanolamine, N-methylethanolamine; N-methylpiperidine; 3-methylpiperidine; N-methylcyclohexylamine; 3-methylpyridine; 4-methylpyridine; quinuclidine; $N_1N$-dimethyl-1,4-diazabicyclo(2,2,2) octane ion; di-n-butylamine, neopentylamine; di-n-pentylamine; isopropylamine; t-butylamine; ethylenediamine; pyrolidine; and 2-imidazolidone. Not every templating agent will direct the formation of every species of non-zeolitic molecular sieve, i.e., a single templating agent can, with proper manipulation of the reaction conditions, direct the formation of several non-zeolitic molecular sieve compositions, and a given non-zeolitic molecular sieve composition can be produced using several different templating agents.

In the preparation of the non-zeolitic molecular sieve, phosphoric acid is the preferred source of phosphorous. Organic phosphates and a crystalline aluminophosphate can also be employed as a source of phosphorous. Silica sol or fumed silica are preferred sources of silicon. Silica gel, alkoxides of silicon, and reactive solid amorphous precipitated silica are also suitable. Preferred sources of the optional element "M" include any elemental or compound form of element "M" which will form oxide units in tetrahedral coordination in the molecular sieve without being detrimental to the integrity of the molecular sieve. Salts of element "M", including halogen, nitrate, sulfate, oxide, sulfides, acetate and oxalate salts are examples of active sources of element "M" which may be used in the present process.

The reaction mixture from which the NZMS is made, expressed in terms of molar oxide ratios on an anhydrous basis, has the following preferred bulk composition:

aR:$(M_xAl_yP_z)O_2$:b$H_2O$ where "R" is a template, "a" has a value great enough to constitute an effective concentration of "R" and is within the range of from greater than zero (0) to about 3; "b" has a value of from zero to 500; "x", "y", and "z" represent the mole fractions, respectively, of element "M", aluminum, and phosphorus wherein "x" has a value equal to or greater than zero (0), and "y" and "z" each have a value of at least 0.01, and wherein "M" represents at least one element, other than aluminum and phosphorous, which is capable of forming an oxide in tetrahedral coordination with $AlO_2$ and $PO_2$.

A preferred synthesis method of this invention comprises:
a) combining an active source of phosphorous and a particulate hydrated alumina to form a reaction mixture, the particulate hydrated alumina having an average particle size of less than about 40μ, a particle density of less than about 1.0 g/cm$^3$ and an alkali content of less than 0.12 wt %, thereafter adding to the reaction mixture an organic templating agent and optionally active source(s) of one or more additional elements "M" capable of forming oxides in tetrahedral coordination with $AlO_2$ and $PO_2$ units;
b) heating the complete reaction mixture at autogenous pressure to a temperature in the range of from 120° C. to 220° C. until crystals of the molecular sieve are formed; and
c) recovering the crystals.

A more preferred method according to the instant process comprises:
a) preparing an aqueous reaction mixture containing phosphoric acid, a reactive source of $SiO_2$, an organic templating agent and a particulate hydrated alumina having an average particle size of less than 40μ, a particle density of less than about 1.0 g/cm$^3$ and an alkali content of less than 0.12 wt %, said reaction mixture having a composition expressed in terms of mole ratios of:

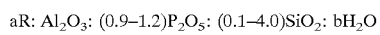

aR: $Al_2O_3$: (0.9–1.2)$P_2O_5$: (0.1–4.0)$SiO_2$: b$H_2O$ wherein R is an organic templating agent; "a" has a value large enough to constitute an effective amount of R and preferably has a value such that there are from 0.20 to 2 moles of R per mole of aluminum oxide; "b" has a value such that there are zero (0) to 100 moles of $H_2O$ per mole of aluminum oxide; said reaction mixture having been formed by combining the alumina and phosphorous sources in the substantial absence of the silicon source and thereafter combining the resulting mixture with the silicon source and the organic templating agent to form the complete reaction mixture;
b) heating the reaction mixture at autogenous pressure to a temperature in the range of from 120° C. to 220° C. until crystals of the non-zeolitic molecular sieve are formed; and
c) recovering said crystals.

MAPO-5, MAPO-11, MAPO-14, MAPO-34 are described in U.S. Pat. No. 4,567,029. The descriptions of the molecular sieves, and of the preparations thereof, are also incorporated by reference. In the preferred synthesis procedure for MAPO-5, MAPO-11, MAPO-14, MAPO-34 and CoAPO-14 molecular sieves, a reaction mixture is prepared having a composition expressed in terms of molar oxide ratios as follows:

aR: $(M_xAl_yP_z)O_2$:b$H_2O$ wherein "R" is a templating agent; "a" has a value great enough to constitute an effective concentration of "R" and is within the range of greater than 0 to 6; "b" has a value of zero to 500, preferably 2 to 30; "M" represents magnesium or cobalt; "x", "y" and "z" represent the mole fractions, respectively, of "M", aluminum and phosphorous in the $(M_xAl_yP_z)O_2$ constituent, and each has a value of at least 0.01.

In the preparation of the reaction mixture in which the crystalline NZMS is formed, water is added to facilitate crystallization and subsequent processing. In one embodiment, the molar ratio of water to alumina in the reaction mixture is in the range of from about zero to about 8, preferably from about 1 to about 6. In this embodiment, sufficient water is added to the reaction mixture prior to crystallization so that the reaction mixture may be adequately blended and may be formed into self-supporting particles. Beyond that amount of water, no additional water is required for crystallization. This method is described in detail in U.S. Pat. No. 5,514,362, the entire disclosure of which is incorporated herein by reference for all purposes.

In a separate embodiment, an aqueous reaction mixture is prepared containing active sources of the NZMS, including sources of alumina, phosphorous and optionally an element other than aluminum and phosphorous to be incorporated into the crystalline molecular sieve. Frequently, a templating agent will also be present. The amount of water added to the reaction mixture in this embodiment is generally less than about 500 moles of water per mole of alumina, preferably from about 8 to about 100, more preferably from about 10 to about 50, moles of water per mole of alumina.

At the start of reaction the pH of the reaction mixture may be adjusted as required for the synthesis of the desired molecular sieve. As an example, the reaction mixture from which silicoaluminophosphates are prepared will typically have an initial pH in the range of about 4.0 to about 8.5. Crystallization of the molecular sieve is conducted at hydrothermal conditions under pressure and usually in an autoclave so that the reaction mixture is subject to autogenous pressure and preferably with stirring. Following crystallization, the reaction mixture containing the crystallized molecular sieve is filtered if sufficient free liquid water is present and the recovered crystals are washed, for example, with water, and then dried, such as by heating at from 25° C. to 150° C. at atmospheric pressure. Preferably any supernatant liquid above the crystals is removed prior to the initial filtering of the crystals.

The molecular sieve prepared by the present method is beneficially subjected to thermal treatment to remove the organic templating agent. This thermal treatment is generally performed by heating at a temperature of 300° C. to 800° C. for at least 1 minute and generally not longer than 20 hours. While subatmospheric pressure can be employed for the thermal treatment, atmospheric pressure is desired for reasons of convenience. The thermally treated product is particularly useful in the catalysis of certain hydrocarbon conversion reactions.

The non-zeolitic molecular sieve can be used in intimate combination with hydrogenating components, such as tungsten, vanadium, molybdenum, rhenium, nickel, cobalt, chromium, manganese, or a noble metal, such as palladium, platinum, rhodium, rhenium, iridium or mixtures thereof, for those applications in which a hydrogenation-dehydrogenation function is desired. Group VIII metals selected from the group consisting of at least one of platinum and palladium are preferred. The amount of metal ranges from about 0.01% to about 10% by weight of the molecular sieve, preferably from about 0.2 to about 5% by weight of the molecular sieve.

Hydrogen, ammonium, and the metal components can be exchanged into the molecular sieve. The molecular sieve can also be impregnated with the metals, or the metals can be physically intimately admixed with the molecular sieve using standard methods known to the art. Alternatively, the metals can be occluded in the crystal lattice by having the desired metals present as ions in the reaction mixture from which the molecular sieve is prepared.

The techniques of introducing catalytically active metals to a molecular sieve are disclosed in the literature, and preexisting metal incorporation techniques and treatment of the molecular sieve to form an active catalyst such as ion exchange, impregnation or occlusion during sieve preparation are suitable for use in the present process. Such techniques are disclosed in U.S. Pat. Nos. 3,236,761; 3,226,339; 3,236,762; 3,620,960, 3,373,109, 4,202,996; 4,440,781 and 4,710,485, which are incorporated herein by reference.

The term "metal" or "active metal" as used herein means one or more metals in the elemental state or in some form such as sulfide, oxide and mixtures thereof. Regardless of the state in which the metallic component actually exists, the concentrations are computed as if they existed in the elemental state.

Following addition of the metals, the molecular sieve may be calcined in air or inert gas at temperatures ranging from about 200° C. to 700° C. for periods of time ranging from 1 to 48 hours, or more, to produce a catalytically active product especially useful in hydrocarbon conversion processes.

The non-zeolitic molecular sieve may be used as a catalyst, without additional forming, when the shaped particles, formed from the reaction mixture described hereinbefore, are of a size and shape desired for the ultimate catalyst. Alternatively, the molecular sieve can be composited with one or more of materials resistant to the temperatures and other conditions employed in organic conversion processes, using techniques such as spray drying, extrusion, and the like. Such matrix materials include active and inactive materials and synthetic or naturally occurring zeolites as well as inorganic materials such as silica, clays and metal oxides such as alumina, magnesia, and titania. Examples of zeolites include synthetic and natural faujasites (e.g., X and Y), erionites, mordenites, and those of the ZSM series, e.g., ZSM-5, etc. The combination of zeolites can also be composited in a porous inorganic matrix. The inorganic materials may occur naturally or may be in the form of gelatinous precipitates, sols, or gels, including mixtures of silica and metal oxides. Use of an active material in conjunction with the synthetic molecular sieve, i.e., combined with it, tends to improve the conversion and selectivity of the catalyst in certain organic conversion processes. Inactive materials can suitably serve as diluents to control the amount of conversion in a given process so that products can be obtained economically without using other means for controlling the rate of reaction. Frequently, molecular sieve materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the new crystal include the montmorillonite and kaolin families which include the subbentonites, and the kaolins commonly known as Dixie, McNamee, Georgia, and Florida clays or others in which the main mineral constituent is halloysite, kaolinite, dickite, nacite, or an auxite. Such clays can be used in the raw state as originally mined or initially subjected to calcination, acid treatment, or chemical modification. Binders useful for compositing with the present crystal also include inorganic oxides, notably alumina or silica.

In addition to the foregoing materials, the non-zeolitic molecular sieve produced can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia, and silica-magnesia-zirconia. The relative proportions of finely divided crystalline non-zeolitic molecular sieve material and inorganic oxide gel matrix vary widely, with the crystal content ranging from 1 to 90% by weight, and more particularly when the composite is prepared in the form of beads, in the range of 2 to 80 weight percent of the composite.

Non-zeolitic molecular sieves prepared in the present process are useful for a variety of organic, e.g., hydrocarbon compound conversion processes. Hydrocarbon conversion reactions are chemical and catalytic processes in which carbon containing compounds are changed to different carbon containing compounds. Examples of hydrocarbon conversion reactions include catalytic cracking, hydrocracking, dewaxing, and olefin and aromatics formation reactions, including formation from oxygenates. The catalysts are useful in other petroleum refining and hydrocarbon conversion reactions such as isomerizing and hydroisomerizing paraffins and olefins, polymerizing and oligomerizing olefinic or acetylinic compounds such as isobutylene and pentene-1, reforming, alkylating, isomerizing polyalkylsubstituted aromatics (e.g. meta xylene), and disproportionating aromatics (e.g. toluene) to provide mixture of benzene, xylenes and higher methylbenzenes.

The molecular sieve prepared in the present process can be used in a process to dewax hydrocarbonaceous feeds. The catalytic dewaxing conditions are dependent in large measure on the feed used and upon the desired pour point. Generally, the temperature will be between about 200° C. and about 475° C., preferably between about 250° C. and about 450° C. The pressure is typically between about 200 psig and 3000 psig. The liquid space velocity (LHSV) preferably will be from 0.1 to 20, preferably between about 0.2 and about 10.

Hydrogen is preferably present in the reaction zone during the catalytic dewaxing process. The hydrogen to feed ratio is typically between about 500 and about 30,000 SCF/bbl (standard cubic feet per barrel), preferably about 1000 to about 20,000 SCF/bbl. Generally, hydrogen will be separated from the product and recycled to the reaction zone.

It has been found that the present dewaxing process provides selective conversion of waxy n-paraffins to non-waxy products of higher molecular weight when compared to products obtained using the prior art zeolitic catalyst. During the processing, the n-paraffins and the slightly branched paraffins undergo some cracking or hydrocracking to form liquid range materials which contribute to a low viscosity product. The degree of cracking which occurs is, however, limited so that the gas yield is reduced, thereby preserving the economic value of the feedstock. At the same time, a measure of isomerization takes place, so that not only is the pour point reduced by reason of the cracking reactions described above, but in addition the n-paraffins become isomerized to iso-paraffins to form liquid range materials which contribute to a low viscosity, low pour point product.

The dewaxing process may be used to dewax a variety of feedstocks ranging from relatively light distillate fractions up to high boiling stocks such as whole crude petroleum, reduced crudes, vacuum tower residua, cycle oils, synthetic crudes (e.g., shale oils, tars and oils, etc.), gas oils, vacuum gas oils, foot oils, and other heavy oils. The feedstock will normally be a $C_{10}$- feedstock generally boiling above about 350° F. containing paraffins, olefins, naphthenes, aromatics, and heterocyclic compounds and with a substantial proportion of higher molecular weight n-paraffins and slightly branched paraffins which contribute to the waxy nature of the feedstock since lighter oils will usually be free of significant quantities of waxy components. The process is particularly useful with waxy distillate stocks such as middle distillate stocks including gas oils, kerosenes, and jet fuels, lubricating oil stocks, heating oils and other distillation fractions whose pour point and viscosity need to be maintained within certain specification limits. Lubricating oil stocks will generally boil above 230° C. (450° F.), more usually above 315° C. (600° F.). Hydroprocessed stocks which include stocks which have been hydrotreated to lower metals, nitrogen and sulfur levels and/or hydrocracked, are a convenient source of stocks of this kind and also of other distillate fractions since they normally contain significant amounts of waxy n-paraffins.

While the process herein can be practiced with utility when the feed contains organic nitrogen (nitrogen-containing impurities), it is preferred that the organic nitrogen content of the feed be less than 50, more preferably less than 10, ppmw.

The NZMS catalyst may be used to isomerize a waxy feedstock. The waxy feedstock preferably contains greater than about 50% wax, more preferably greater than about 90% wax. However, a highly paraffinic feed having a high pour point, generally above about 0° C., more usually above about 10° C., but containing less than 50% wax is also suitable for use in the process of the invention. Such a feed should preferably contain greater than about 70% paraffinic carbon, more preferably greater than about 80% paraffinic carbon, most preferably greater than about 90% paraffinic carbon.

Exemplary additional suitable feeds for use in the process of the invention include waxy distillate stocks such as gas oils, lubricating oil stocks, synthetic oils such as those by Fischer-Tropsch synthesis, high pour point polyalphaolefins, foots oils, synthetic waxes such as normal alphaolefin waxes, slack waxes, deoiled waxes and microcrystalline waxes. Foots oil is prepared by separating oil from the wax. The isolated oil is referred to as foots oil.

Slack wax can be obtained from either a hydrocracked lube oil or a solvent refined lube oil. Hydrocracking is preferred because that process can also reduce the nitrogen content to low values. With slack wax derived from solvent refined oils, deoiling can be used to reduce the nitrogen content. Optionally, hydrotreating of the slack wax can be carried out to lower the nitrogen content thereof. Slack waxes possess a very high viscosity index, normally in the range of from 140 to 200, depending on the oil content and the starting material from which the wax has been prepared. Slack waxes are therefore eminently suitable for the preparation of lubricating oils having very high viscosity indices, i.e., from about 120 to 180.

In the dewaxing process using the catalyst of the present invention, the pour point of the dewaxed product is lower than the pour point of the feed to the dewaxing process. For oils of commercial interest, the pour point of the oil is generally below about 10° C., and often below 0° C. Indeed, with the proper choice of dewaxing conditions and feedstock, a pour point below −24° C. (generally between −24° C. and −63° C.) can be achieved. While the viscosity index of the dewaxed oil is not critical to the dewaxing process, it is a feature of the dewaxing process using the present catalyst that the viscosity index of the feedstock is not adversely affected, and is indeed often improved, in the dewaxing process. This is in contrast to conventional dewaxing processes using zeolite catalysts, in which the viscosity index is frequently reduced during dewaxing. The viscosity index of the dewaxed oil will generally be above 90. Depending on the dewaxing conditions and the feeds used for the dewaxing process, a viscosity index between 125 and 180 can be achieved.

When used in the dewaxing process, the non-zeolitic molecular sieve is employed in admixture with at least one group VIII metal as, for example, the noble metals such as platinum and palladium, and optionally other catalytically active metals such as nickel, tungsten, molybdenum, cobalt, vanadium, zinc, etc. The amount of metal ranges from about 0.01% to 10% and preferably 0.2 to 5% by weight of the molecular sieve.

The Group VIII metal utilized in the process of this invention can mean one or more of the metals in its elemental state or in some form such as the sulfide or oxide and mixtures thereof. As is customary in the art of catalysis, when referring to the active metal or metals, it is intended to encompass the existence of such metal in the elementary state or in some form such as the oxide or sulfide as mentioned above, and regardless of the state in which the metallic component actually exists, the concentrations are computed as if they existed in the elemental state.

The NZSM can be used in a process to prepare lubricating oils. The process comprises (a) hydrocracking in a hydrocracking zone a hydrocarbonaceous feedstock to obtain an effluent comprising a hydrocracked oil, and (b) catalytically dewaxing in a catalytic dewaxing zone the hydrocracked oil of step (a) with a catalyst comprising a non-zeolitic molecular sieve and a Group VIII metal, preferably platinum or palladium.

Another embodiment of this process includes an additional step of stabilizing said dewaxed hydrocrackate by catalytic hydrofinishing.

The hydrocarbonaceous feeds from which lube oils are made usually contain aromatic compounds as well as normal and branched paraffins of very long chain lengths. The feeds usually boil in the gas oil range. Preferred feedstocks are vacuum gas oils with normal boiling ranges in the range of 350° C. to 600° C., and deasphalted residual oils having normal boiling ranges from about 480° 0 C. to 650° C. Reduced topped crude oils, shale oils, liquefied coal, coke distillates flash or thermally cracked oils, atmospheric residua, and other heavy oils can also be used. The first step in the processing scheme is hydrocracking. In commercial operations, hydrocracking can take place as a single-step in the process, or as a multistep process using initial denitrification or desulfurization steps, all of which are well known.

A typical hydrocracking process is described, for example, in U.S. Pat. No. 5,158,665, the entire disclosure of which is incorporated herein by reference. It may further be desired to hydrofinish the dewaxed oil in a mild hydrogenation process to produce more stable lubrication oils. A description of a typical hydrofinishing process and catalyst which is useful in the present process is also taught in U.S. Pat. No. 5,158,665.

The following examples are provided to illustrate the invention and are not intended to be limiting thereof:

EXAMPLES

Example 1

SAPO-11 was prepared as follows: a reaction mixture was prepared by combining 502 grams of 86% $H_3PO_4$ with 320 grams of deionized ice in a Teflon beaker in a cold water bath. To the reaction mixture were slowly added 129 grams of $Al(OH)_3$ (52 wt % $Al_2O_3$) with 577 grams of cold deionized water while simultaneously mixing with a stirrer and grinding with a Polytron. The $Al(OH)_3$, F-2000: R254-30 alumina hydroxy carbonate supplied by Reheis Inc. (New Jersey), had an average particle diameter of 9.4 microns (by Malvern particle size analysis). The sodium content of the $Al(OH)_3$ was about 0.08 wt %. The particle density of the $Al(OH)_3$ was 0.57 glcm$^3$.

98 grams of di-n-propylamine were then added to the reaction mixture, followed by another 300 grams of $Al(OH)_3$ and 253 grams of cold water with mixing/grinding. Another 98 grams of di-n-propylamine were then added along with 64 grams of fumed silica (Cabosil M-5) with mixing/grinding. The mixture had the following composition, expressed in molar ratio of oxides:

0.9 $Pr_2NH$: 0.5 $SiO_2$: $Al_2O_3$: $P_2O_5$: 36 $H_2O$

The mixture was placed in a Teflon bottle in a stainless steel pressure vessel and heated for 2 days at 190° C. at autogenous pressure with stirring. The supernatant liquid was removed and the product filtered, washed with water, dried overnight at 120° C. in a vacuum oven, and calcined in air at 593° C. for 8 hours. X-ray diffraction analysis identified the product as SAPO-11. The average crystallite size by SEM was less than 0.5 microns. The calcined sieve had the following anhydrous molar composition:

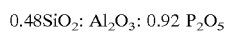
0.48$SiO_2$: $Al_2O_3$: 0.92 $P_2O_5$

The sodium content of the sieve was about 300 ppm.

Example 2

The sieve of Example 1 was impregnated with 0.5 wt % platinum and tested in a continuous-flow high-pressure pilot plant for lowering the pour point of a hydrocracked heavy neutral oil (Table I). Run conditions were 2.3 hr$^{-1}$ WHSV (weight hourly space velocity), 1950 psi (13.5 MPa) total pressure, and 8 MSCF/bbI once-through $H_2$ (1425 std m$^3$ $H_2$m$^3$ oil). Results are shown in Table II.

Example 3

80 grams of the 4.7 micron Reheis $Al(OH)_3$ from Example 1 were placed in a small Baker-Perkins mixer. To this were added 8 grams of water and 89.8 grams of 86% $H_3PO_4$, followed by 9.6 grams of fumed silica (Cabosil M-5) and 14 grams of peptized and neutralized Catapal alumina (40 wt % $Al_2O_3$, 60 wt % $H_2O$), the latter to serve as a binder and to facilitate extrusion. After about 2 hours of mixing, 28.8 grams of a 3/1 template mixture of di-n-propylamine and di-isopropylamine were added with mixing. The mix was partially air-dried in a hood and then extruded through a ¹⁄₁₂-inch die. The extrudate was placed in a Teflon bottle in a stainless steel pressure vessel and crystallized at 180° C. and autogenous pressure for 2 days. Synthesis molar ratios, expressed as oxides, were as follows:

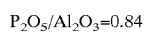
$P_2O_5/Al_2O_3$=0.84

template mixture/$P_2O_5$32 0.73

$SiO_2/P_2O_5$=0.37

The product was washed with water, dried overnight in a vacuum oven at 120° C., and then calcined in air at 593° C. for 6 hours. X-ray diffraction analysis showed the product to be SAPO-11.

Example 4

The catalyst of Example 3 was impregnated with 0.5 wt % Pt and tested for lowering the pour point of the waxy hydrocracked heavy neutral feedstock of Table I. Run conditions were 2.3 hr$^{-1}$ WHSV, 1950 psi (13.5 MPa) total pressure, and 8 MSCF/bbl once-through H$_2$ (1425 std m$^3$ H$_2$m$^3$ oil). Results are shown in Table III.

Example 5

502 grams of 86% H$_3$PO$_4$ were placed in a stainless steel bucket in an ice bath. To the bucket were added 120 grams of deionized ice and 600 grams of cold water. To this were slowly added 129 grams of Al(OH)$_3$ (Reheis F-2000: R254-27 Al(OH)$_3$ with a sodium content of 0.04 wt %) along with 577 grams of cold deionized water while simultaneously mixing with a stirrer and grinding with a Polytron. Then 98 grams of di-n-propylamine were added, followed by another 300 grams of Al(OH)$_3$ and 253 grams of cold water with mixing/grinding. Another 98 grams of di-n-propylamine were then added along with 64 grams of fumed silica with mixing/grinding. The mixture had the following composition, expressed in molar ratio of oxides:

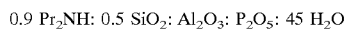

0.9 Pr$_2$NH: 0.5 SiO$_2$: Al$_2$O$_3$: P$_2$O$_5$: 45 H$_2$O

The maximum viscosity during the mix was 480 cp (measured at 20° C.), which was also the final viscosity. The mixture was placed in a stainless steel container and crystallized in a pressure vessel at 190° C. for two days at autogenous pressure with stirring. The supernatant liquid was removed and the product filtered, washed with water, dried overnight at 120° C. in a vacuum oven, and calcined in air at 593° C. for six hours. X-ray diffraction analysis identified the product as SAPO-11. The average crystallite size by SEM was less than 0.5 microns. The calcined sieve had the following anhydrous molar composition:

0.48 SiO$_2$: Al$_2$O$_3$: 0.89 P$_2$O$_5$

Example 6

The sieve of Example 5 was mixed with 15 wt % (volatiles free) peptized Catapal alumina and extruded through a 1/16-inch die. The extrudate was dried in an oven at 66° C. for one hour, 93° C. for one hour, and 121° C. for three hours, and then calcined in flowing air at 454° C. for four hours. The extrudate was then impregnated with 0.4 wt % platinum using an aqueous solution of Pt(NH$_3$)$_4$Cl$_2$. The extrudate was dried at 66° C. for three hours, and then calcined in flowing air at 288° C. for four hours.

The catalyst was crushed to 24–42 mesh and tested for lowering the pour point of the feed of Table 1. Run conditions were 1.6 hr$^{-1}$ LHSV (liquid hourly space velocity), 1950 psi (13.5 MPa) total pressure, and 8 MSCF/bbI once-through H$_2$ (1425 std m$^3$ H$_2$m$^3$ oil). Results are shown in Table IV.

The following example illustrates the effect of using a hydrated alumina having a particle size and particle density outside the range of the alumina source of the present invention.

Comparative Example 1

SAPO-11 was prepared similar to Example 3 except that the Reheis Al(OH)$_3$ was substituted by 56 grams of a hydrated aluminum oxide (pseudo-boehmite, 73 wt % Al$_2$O$_3$, 37 wt % H$_2$O) containing 70 ppm sodium. The average particle diameter of the hydrated aluminum oxide was 134 microns, and the particle density approximately 1.3 g/cm$^3$. The catalyst was impregnated with Pt and tested for dewaxing as in Example 4. At a catalyst temperature of 720° F. (382° C.), the product pour point was –3° C., showing less pour point reduction than a catalyst of this invention at the same reactor temperature.

The following example illustrates the effect of using a hydrated alumina having an alkali content outside the range of the alumina source of the present invention.

Comparative Example 2

SAPO-11 was prepared as in Example 5 with the exception that the Al(OH)$_3$ contained a sodium level of 0.14 wt %. The calcined sieve had the same composition as the sieve of Example 5 but with a sodium content of 530 ppm.

An extrudate catalyst containing 0.4 wt % Pt was then prepared as in Example 6 using this sieve. The catalyst was then used to lower the pour point of the feed of Table 1 at the same conditions as listed in Example 6. The results, given in Table IV, show that this catalyst was over 40° F. less active than the catalyst of Example 6.

The following example illustrates the effect of using a hydrated alumina having an alkali content outside the range of the alumina source of the present invention, and illustrates the effect on catalyst performance of removing alkali from the finished non-zeolitic molecular sieve.

Comparative Example 3

SAPO-11 was prepared as in Example 1 with the exception that the Al(OH)$_3$ (Reheis F-2000 alumina hydroxy carbonate having the same physical properties as that used in Example 1, but with higher sodium content) contained a sodium level of 0.25 wt %. The calcined sieve had the following anhydrous molar composition:

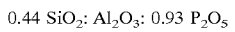

0.44 SiO$_2$: Al$_2$O$_3$: 0.93 P$_2$O$_5$

The sodium content was 710 ppm. The sieve was then divided into two portions. The first was impregnated with 0.5 wt % Pt. The other portion was first exchanged with an aqueous ammonium acetate solution to lower the sodium content of the sieve to 240 ppm, and then impregnated with 0.5 wt % Pt.

Both sieves were tested for lowering the pour point of a heavy neutral oil similar to that of Table 1. Run conditions were 2.3 WHSV, 1950 psi (13.5 MPa) total pressure, and 8 MSCF/bbl once-through H$_2$ (1425 std m$^3$ H$_2$m$^3$ oil). The NH$_4^+$-exchanged sieve was 5 to 10° F. less active than the starting sieve, showing that exchange of the sieve to remove sodium after synthesis is not effective in improving activity compared to starting with a low sodium Al(OH)$_3$.

The following example illustrates that using a hydrated alumina having a particle density outside the range of the present invention adversely affects the viscosity of the reaction mixture.

Comparative Example 4

502 grams of 86% H$_3$PO$_4$ were added to a stainless steel bucket cooled in an ice bath. 240 grams of deionized ice were then added with stirring. 105 grams of Catapal alumina (73 wt % Al$_2$O$_3$, 27 wt % H$_2$O), and 791 grams of deionized ice were slowly added with stirring and grinding over a 90-minute time period. The Catapal as used had a particle density of approximately 1.3 g/cm$^3$. At that point, the viscosity of the mix, measured at 16° C., had risen to 29,000 cp. 98 grams of di-n-propylamine were then added. 192 more grams of alumina were added (to bring the Al/P mole ratio to 0.97) along with 250 grams of ice. The mixture had the following composition, expressed in molar ratio of oxides:

0.9 Pr$_2$NH: 0.5 SiO$_2$: Al$_2$O$_3$: P$_2$O$_5$: 37 H$_2$O

The viscosity of the mix was 15,000 cp. The high viscosity of this preparation makes synthesis at a large scale difficult due to problems in mixing.

Comparative Example 5

SAPO-11 was prepared according to Example 1 of U.S. Pat. No. 5,246,566. The alumina source was aluminum isopropoxide (Al[OC$_3$H$_7$]$_3$), and the sodium content of the resulting SAPO-11 was found to be approximately 40 ppm. This comparative example shows that SAPO-11 made using a known source of alumina had a sodium level below that of the present non-zeolitic molecular sieve.

TABLE I

Properties of a Hydrocracked Heavy Neutral Feed

| | | |
|---|---|---|
| Gravity, API | 28.2 | |
| Sulphur, ppm | 36 | |
| Nitrogen, ppm | 3.5 | |
| Pour Point, ° C. | +45 | |
| Viscosity, cSt | | |
| @ 70° C. | 28.57 | |
| @ 100° C. | 11.77 | |
| Sim. Dist., LV % | ° F. | ° C. |
| St/5 | 799/841 | 426/449 |
| 10/30 | 868/925 | 464/496 |
| 50 | 967 | 519 |
| 70/90 | 1011/1080 | 544/582 |
| 95/EP | 1112/1149 | 600/621 |
| Solvent Dewaxed Oil | | |
| Yield, wt % | 78.6 | |
| Pour Point, ° C. | −22 | |
| Cloud Point, ° C. | −24 | |
| Viscosity, cSt | | |
| @ 40° C. | 136.0 | |
| @ 100° C. | 12.99 | |
| Viscosity Index | 87 | |

TABLE II

Dewaxing Heavy Neutral at 2.3 WHSV and 1950 psi (13.5 MPa)

| | | |
|---|---|---|
| Rxn Temperature, ° F. (° C.) | 690° F. (366° C.) | 697° F. (369° C.) |
| Yield | | |
| Total Lube Yield, LV % | 90.1 | 90.4 |
| Yield of 700 ° F.+ (371° C.+) product, wt % | 94.1 | 92.5 |

TABLE II-continued

Dewaxing Heavy Neutral at 2.3 WHSV and 1950 psi (13.5 MPa)

| Product Properties | | | | |
|---|---|---|---|---|
| Pour Point, ° C. | −9 | | −13 | |
| Cloud Point, ° C. | −6 | | −11 | |
| Viscosity, cSt | | | | |
| @ 40° C. | 125.3 | | 121.9 | |
| @ 100° C. | 12.90 | | 12.72 | |
| Viscosity Index | 95 | | 96 | |
| Sim. Dist., LV % | ° F. | ° C. | ° F. | ° C. |
| St/5 | 779/841 | 415/449 | 762/837 | 406/447 |
| 10/30 | 865/915 | 463/491 | 862/914 | 461/490 |
| 50 | 950 | 510 | 950 | 510 |
| 70/90 | 987/1038 | 531/559 | 986/1038 | 530/559 |
| 95/EP | 1067/1138 | 575/614 | 1066/1138 | 574/614 |

TABLE III

Dewaxing Heavy Neutral at 2.3 WHSV and 1950 psi (13.5 MPa)

| | | | | |
|---|---|---|---|---|
| Reactor temperature, ° F. (° C.) | 720 (382) | | 728 (387) | |
| Yield | | | | |
| Total Lube Yield, LV % | 88.8 | | 87.6 | |
| Yield of 700 ° F.+ (371° C.+) product, wt % | 85.4 | | 84.0 | |
| Product Properties | | | | |
| Pour Point, ° C. | −14 | | −18 | |
| Cloud Point, ° C. | −10 | | −13 | |
| Viscosity, cSt | | | | |
| @ 40° C. | 110.0 | | 106.5 | |
| @ 1000° C. | 11.73 | | 11.53 | |
| Viscosity Index | 94 | | 95 | |
| Sim. Dist., LV %, | ° F. | ° C. | ° F. | ° C. |
| St/5 | 638/764 | 337/407 | 532/759 | 278/404 |
| 10/30 | 813/897 | 434/481 | 813/896 | 434/480 |
| 50 | 939 | 504 | 938 | 503 |
| 70/90 | 979/1035 | 526/557 | 978/1033 | 526/556 |
| 95/EP | 1069/1142 | 576/617 | 1068/1142 | 576/617 |

TABLE IV

DEWAXING HN AT 1.6 HR$^{-1}$ LHSV, 1950 PSI (13.5 MPa), AND 8 MSCF/BBL H$_2$ (1425 std m$^3$ H$_2$/m$^3$ $^{oil}$).

| | Example 6 | | Comparative Example 2 |
|---|---|---|---|
| Temperature, ° F. (° C.) | 697° F. (369° C.) | 705° F. (374° C.) | 740° F. (393° C.) |
| Lube Yield, LV % | 92.5 | 95.0 | 90.6 |
| Yield of 700° F.+ (371° C.+) Product | 93.1 wt % | 92.4 wt % | 88.7 wt % |
| Pour Point, ° C. | −11 | −15 | −10 |
| Cloud Point, ° C. | −8 | −10 | +2 |
| Viscosity | | | |
| 40° C., cSt | 114.1 | 104.2 | 109.0 |

TABLE IV-continued

DEWAXING HN AT 1.6 HR$^{-1}$ LHSV, 1950 PSI (13.5 MPa), AND 8 MSCF/BBL H$_2$ (1425 std m$^3$ H$_2$/m$^3$ oil).

|  | Example 6 | | | | Comparative Example 2 | |
|---|---|---|---|---|---|---|
| 100° C., cSt | 12.8 | | 11.48 | | 11.73 | |
| VI | 96 | | 97 | | 95 | |
| Sim. Dist., LV %, ° F. | ° F. | ° C. | ° F. | ° C. | ° F. | ° C. |
| ST/5 | 754/815 | 401/435 | 650/774 | 343/412 | 660/780 | 349/416 |
| 10/30 | 846/911 | 452/488 | 819/897 | 437/481 | 822/899 | 439/482 |
| 50 | 952 | 511 | 939 | 504 | 941 | 505 |
| 70/90 | 990/1037 | 532/558 | 978/1024 | 526/551 | 980/1026 | 527/552 |
| 95/EP | 1062/1137 | 572/614 | 1051/1125 | 566/607 | 1053/1118 | 567/603 |

I claim:

1. A hydrocarbon conversion process comprising contacting a hydrocarbon oil feedstock with a molecular sieve which contains from about 75 to about 500 ppm alkali and which has a unit empirical formula on an anhydrous basis of $$(M_xAl_yP_z)O_2$$

wherein:

"M" represents at least one element, other than aluminum and phosphorous, which is capable of forming oxides in tetrahedral coordination with Al$_2$ and PO$_2$ oxide structural units in the crystalline molecular sieve; and "x", "y", and "z" represent the mole fractions, respectively, of an element "M", aluminum, and phosphorus, wherein "x" has a value equal to or greater than zero (0), and "y" and "z" each have a value of at least 0.01 and wherein.

2. The process according to claim 1, which process is selected from the group consisting of catalytic cracking, hydrocracking, dewaxing, olefin and aromatics formation reactions, isomerizing and hydroisomerizing paraffins and olefins, polymerizing and oligomerizing olefinic or acetylinic compounds, reforming, alkylating, isomerizing polyalkylsubstituted aromatics, and disproportionating aromatics.

3. The process according to claim 1 at dewaxing conditions, including a temperature of from about 200° C. to about 475° C., a pressure of about 15 psig to about 3000 psig, a liquid hourly space velocity of from about 0.1 hr$^{-1}$ to about 20 hr$^{-1}$, and a hydrogen circulation rate of from 500 to about 30,000 SCF/bbl.

4. The process according to claim 1 wherein the feedstock is a C10+ feedstock boiling above about 350° F.

5. The process according to claim 3 wherein the feedstock is a C10+ feedstock boiling above about 350° F.

6. The process according to claim 4 wherein the feedstock is a lubricating oil stock which boils above about 450° F., and contains less than about 50 ppm organic nitrogen.

7. The process according to claim 4 wherein the feedstock is a waxy feedstock which contains greater than about 50% wax and greater than about 70% paraffinic carbon.

8. The process according to claim 7 wherein the feedstock is a waxy feedstock which contains greater than about 90% wax and greater than about 80% paraffinic carbon.

9. The process according to claim 1 wherein the dewaxed product has a pour point of less than about 10° C.

10. The process according to claim 9 wherein the dewaxed product has a viscosity index of above 90.

11. The process according to claim 10 wherein the dewaxed product has a viscosity index of between 125 and 180.

12. The process according to claim 1 wherein the feedstock is derived from a hydrocracking process.

13. The process according to claim 1 further comprising hydrofinishing the dewaxed oil product.

14. The process according to claim 1 wherein "M" is one or more element(s) selected from the group consisting of arsenic, beryllium, boron, chromium, cobalt, gallium, germanium, iron, lithium, magnesium, manganese, silicon, titanium, vanadium, and zinc.

15. The process according to claim 14 wherein "M" is one or more element(s) selected from the group consisting of silicon, magnesium, manganese, zinc, and cobalt.

16. The process according to claim 15 wherein "M" is silicon.

17. The process according to claim 16 wherein the molecular sieve is SAPO-11.

18. The process according to claim 16 wherein the molecular sieve is SM-3.

19. The process according to claim 1 wherein the molecular sieve is prepared by a process comprising maintaining a reaction mixture containing an active source of phosphorous and a particulate hydrated alumina under crystallization conditions until crystals of the molecular sieve form, the particulate hydrated alumina having an average particle size of less than about 40μ, a particle density of less than about 1.0 g/cm$^3$ and an alkali content of less than 0.12 wt %.

20. A hydrocarbon conversion process comprising contacting a hydrocarbon oil feedstock with a catalyst comprising a molecular sieve and at least one Group VII metal, the molecular sieve containing from about 75 to about 500 ppm alkali and having a unit empirical formula on an anhydrous basis of $$(M_xAl_yP_z)O_2$$

wherein:

"M" represents at least one element, other than aluminum and phosphorous, which is capable of forming oxides in tetrahedral coordination with AlO$_2$ and PO$_2$ oxide structural units in the crystalline molecular sieve; and "x", "y", and "z" represent the mole fractions, respectively, of an element "M", aluminum, and phosphorus, wherein "x" has a value equal to or greater than zero (0), and "y" and "z" each have a value of at least 0.01.

21. The process according to claim 20 wherein the Group VIII metal is selected from the group consisting of platinum and palladium and wherein the Group VIII metal is present in the range of 0.01% to 10% based on the weight of the molecular sieve.

22. A process for catalytically dewaxing a hydrocarbon oil feedstock boiling above about 350° F. and containing straight-chain and slightly branched-chain hydrocarbons, which comprises contacting said hydrocarbon oil feedstock with a catalyst comprising a molecular sieve, and at least one Group VIII metal at a temperature of from about 200 °C. to 475° C., a pressure of about 15 psig to about 3000 psig, a liquid hourly space velocity of from about 0.1 $hr^{-1}$ to about 20 $hr^{-1}$, and a hydrogen circulation rate of from 500 to about 30,000 SCF/bbI, the molecular sieve prepared by a process comprising maintaining a reaction mixture containing an active source of phosphorous and a particulate hydrated alumina under crystallization conditions until crystals of a non-zeolitic molecular sieve form, the particulate hydrated alumina having an average particle size of less than about 40μ, a particle density of less than about 1.0 g/cm³ and an alkali content in the range of about 0.01 wt % to about 0.10 wt %.

23. The process according to claim 22 wherein the Group VIII metal is selected from the group consisting of platinum and palladium and wherein the Group VIII metal is present in the range of 0.01% to 10% based on the weight of the molecular sieve.

24. The process according to claim 22 further comprising hydrocracking a hydrocarbon feedstock at a temperature of from 250° C. to 500° C., a pressure of about 425 psig to about 3000 psig, a liquid hourly space velocity of from about 0.1 $hr^{-1}$ to about 50 $hr^{-1}$, and a hydrogen circulation rate of from 400 to about 15,000 SCF/bbI to obtain the hydrocarbon oil feedstock.

25. The process according to claim 22 which further includes hydrogenating the dewaxed product over a hydrogenation catalyst under hydrogenation conditions.

26. The process according to claim 22 wherein the molecular sieve is selected from the group consisting of SM-3, SAPO-11, SAPO-31 and SAPO-41.

27. The process according to claim 26 wherein the molecular sieve is SAPO-11.

28. The process according to claim 22 wherein the molecular sieve contains from about 75 to about 500 ppm alkali.

29. The process according to claim 28 wherein the molecular sieve contains from about 75 to about 400 ppm alkali.

30. The process according to claim 29 wherein the molecular sieve contains from about 75 to about 225 ppm alkali.

31. The process according to claim 22 wherein the dewaxed product has a viscosity index of above 90 and a pour point below 0° C.

* * * * *

UNITED STATES PATENT AND TRADEMARK OFFICE
CERTIFICATE OF CORRECTION

PATENT NO. : 5,942,104
DATED : August 24, 1999
INVENTOR(S) : Stephen J. Miller

It is certified that error appears in the above-identified patent and that said Letters Patent is hereby corrected as shown below:

Claim 1, line 34, "least 0.01 and wherein." should read --least 0.01.--

Claim 22, line 8, "about $0.1hr^{311}$ to about" should read --about $0.1hr^{-1}$ to about--

Signed and Sealed this

Eleventh Day of January, 2000

Attest:

Q. TODD DICKINSON

Attesting Officer     Acting Commissioner of Patents and Trademarks